March 27, 1945. W. T. ROSSELL 2,372,396
CAR BODY CONSTRUCTION
Filed March 11, 1942 2 Sheets-Sheet 2
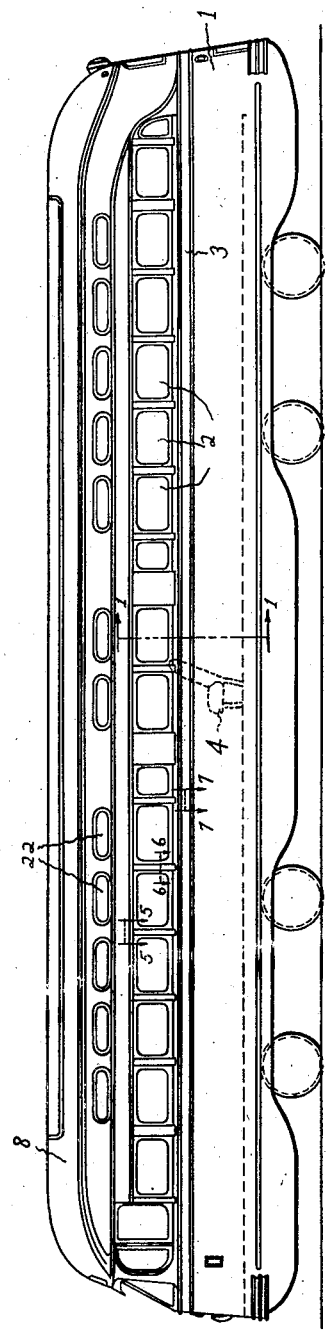
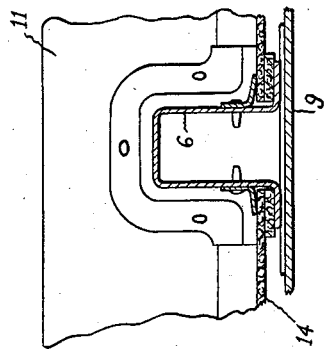
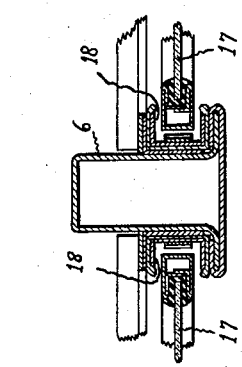
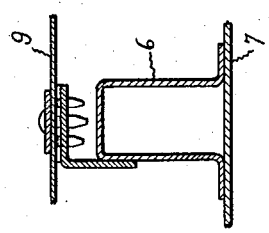
INVENTOR.
Wm. T. Rossell
BY
ATTORNEY.

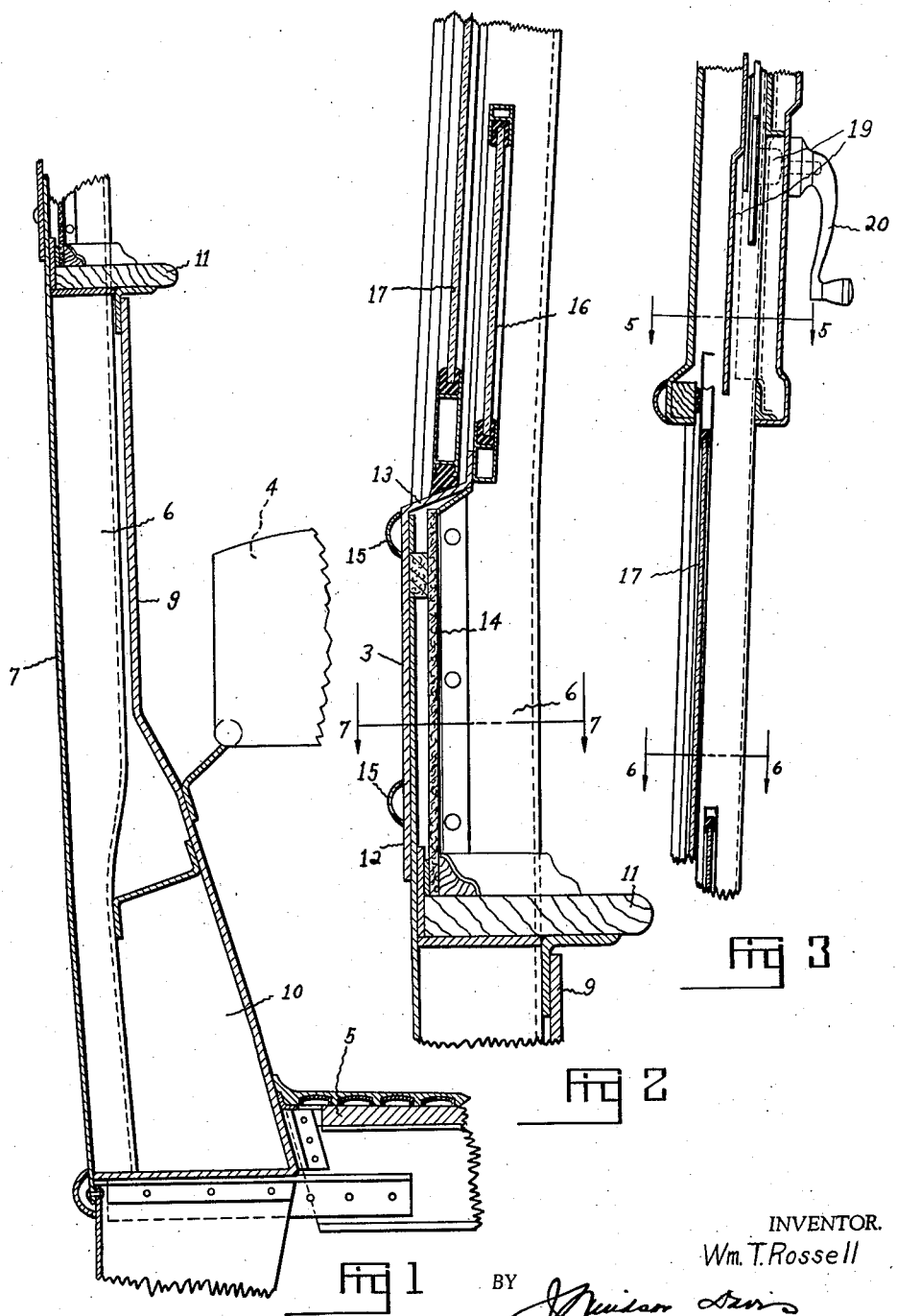

Patented Mar. 27, 1945

2,372,396

UNITED STATES PATENT OFFICE 2,372,396

CAR BODY CONSTRUCTION

William T. Rossell, St. Louis, Mo., assignor to Transit Research Corporation, New York, N. Y., a corporation of New York Application March 11, 1942, Serial No. 434,247

7 Claims. (Cl. 105—401)

This invention relates to the bodies of public vehicles and has for its object to provide a body which will give greater room and increased passenger comfort without alteration to the exterior dimension thereof.

In a public vehicle body the conventional arrangement is side by side seats separated by an aisle. The seats are necessarily so narrow that when two large people occupy the same seat they are rather crowded. I have found that the discomfort of such crowding may be relieved in large measure if additional forearm and shoulder room is provided. A primary object of this invention is to provide a sidewall construction entailing the use of an arm rest with a thinner sidewall construction thereabove, this thinner portion being preferably at the belt of the body.

Another object is to provide a sidewall construction comprising an air duct of generally triangular or trapezoidal cross-section extending upwardly from the floor of the car to the level of an arm rest, a thin wall construction above the arm rest and a window construction thereabove, the windows being separated by pier posts or body pillars which extend from the floor toward the roof of the body.

Other objects and advantages will become hereinafter more readily apparent as reference is had to the accompanying drawings wherein my invention is illustrated as applied to a street car body and in which Figure 1 is a fragmentary vertical transverse section through a vehicle wall built according to my invention, that part of the wall being shown from and including the floor level to the arm rest;

Figure 2 is a view similar to Figure 1 showing the wall construction from and including the arm rest and lower portions of the windows thereabove;

Figure 3 is a view similar to Figures 1 and 2 showing that portion of the sidewall from the upper portion of the windows to the window lift, the showing of Figure 2 somewhat overlapping the showings of Figures 1 and 3, the three views together representing a section taken along the line 1—1 of Figure 4.

Figure 4 is a side elevation of a rail vehicle;

Figure 5 is a horizontal section taken along the line 5—5 of Figure 3;

Figure 6 is a horizontal section taken along the line 6—6 of Figure 3, and

Figure 7 is a horizontal section taken along the line 7—7 of Figure 2.

Referring first to Figure 4, 1 indicates a street car body having windows 2 above the belt rail 3 thereof. A seat 4 is placed beside each window 2 and an aisle (not shown) runs between seats at opposite sides of the car. The body 2 is made, generally, of a floor 5 having a plurality of posts or pillars or pier posts 6 arising therefrom at spaced intervals, these posts extending upwardly between the windows 2, a sheet metal covering 7 for the exterior of all of the posts 6 and a roof 8. We are not here concerned with the entrance and exit, motorman's compartment nor doors.

An interior covering 9 covers the lower portion of the posts 6 and diverges therefrom from a point approximately equal to the height of the bottom of the seats 4 to form an air duct 10 as a part of a body ventilating system, the lower extremity of the exterior covering 7 forming another wall of the duct 10. This sheet 9 terminates slightly below the belt line 3 at arm rests 11 which are placed at appropriate heights beside each seat 4.

The exterior sheet or covering 7 extends upwardly above the arm rest, being covered by a further sheet 12 which forms a window ledge 13 at its upper edge. A liner 14 for insulating and decorative purposes extends upwardly from the arm rests 11, this liner 14 being set back from the sheet 9 by a substantial amount which provides additional room for passenger use above the arm rests.

The sheet 12 is provided with beadings 15. The space therebetween is generally painted a different color from the rest of the car body and is called the belt line or belt rail 3.

The inside upper edge of the window sill 13 constitutes a supporting rest for a wind deflector 16, preferably, in the form of a pane of glass which is fixedly secured in place. The main window panes 17 reside in channels 18 and are adapted to be raised and lowered by a mechanism 19 operable by a handle 20. The window 19 may be partially elevated to inlet fresh air but rain can not enter the body because of the deflector 16.

Above the windows 2 is a space covered by the sheet 21 into which the panes 17 may be partially elevated, and above this sheet are additional windows 22 for the visibility of standees.

What I claim is:

1. A sidewall construction for a rail car body comprising a plurality of posts arising from floor level at spaced intervals, an exterior covering for said posts forming the exterior of said body, an interior covering for the lower portion of said posts flared inwardly of the car body out of parallel with the exterior surface of the body from a line intermediate the height of said covering to the floor of said car body, said interior covering terminating at its upper end substantially below windows thereby exposing said posts to interior view for a substantial area, and windows between said posts above said exposed area.

2. A sidewall construction for a rail car body comprising a plurality of posts arising from floor level at spaced intervals, an exterior covering for said posts forming the exterior of said body, an interior covering for the lower portion of said posts, said interior covering terminating at its upper end substantially below windows thereby exposing said posts and a substantial area of said exterior covering to interior view, windows between said posts above said exposed area, and an insulating liner covering each of said areas below said windows.

3. A sidewall construction for a rail car body comprising a plurality of posts arising from floor level at spaced intervals extending upwardly between windows, an exterior covering for all of said posts constituting the exterior of the car body, an interior covering for said posts starting at its upper edge from a line substantially below the bottom of said windows then following said posts for a distance and diverging therefrom to form an air duct, an arm rest extending from the top of said interior covering to said exterior covering at appropriate height, and a liner for said exterior covering between said arm rests and each of said windows.

4. A sidewall construction for a rail car body comprising a plurality of posts arising from floor level at spaced intervals extending upwardly between windows, an exterior covering for all of said posts serving as the exterior of the car body, a horizontal sheet covering a portion of said exterior covering constituting the belt rail and turned inwardly to form ledges for said windows, an interior covering for said posts starting at its upper edge from a line substantially below the bottom of said windows then following said posts for a distance and diverging therefrom to form an air duct, an arm rest extending from the top of said interior covering to said exterior covering at appropriate height, and a liner for said exterior covering between said arm rests and each of said windows.

5. A sidewall construction for a rail car body comprising a plurality of posts arising from floor level at spaced intervals extending upwardly between windows, an exterior covering for all of said posts serving as the exterior of the car body, a horizontal sheet covering a portion of said exterior covering constituting the belt rail and turned inwardly to form ledges for said windows, each of said ledges having an inner flange, an air deflector secured to each of said flanges, an interior covering for said posts extending downwardly from appropriate height for arm rests along said posts for a distance then diverging downwardly therefrom to form a heating and ventilating duct, and arm rests connecting the top of said interior covering and said exterior covering.

6. A sidewall construction for a rail car body comprising a plurality of posts arising from floor level at spaced intervals extending upwardly between windows, an exterior covering for all of said posts serving as the exterior of the car body, a horizontal sheet covering a portion of said exterior covering constituting the belt rail and turned inwardly to form ledges for said windows, each of said ledges having an inner flange, an air deflector secured to each of said flanges, an interior covering for said posts extending upwardly from the floor level to the appropriate height for arm rests, and arm rests connecting the top of said interior covering and said exterior covering, said arm rests being substantially spaced from the bottoms of said windows, and a liner for said exterior covering between said arm rests and said windows.

7. A sidewall construction for a rail car body comprising a plurality of posts arising from floor level at spaced intervals extending upwardly between windows, an exterior covering for all of said posts serving as the exterior of the car body, a horizontal sheet covering a portion of said exterior covering constituting the belt rail and turned inwardly to form ledges for said windows, each of said ledges having an inner flange, an air deflector secured to each of said flanges, an interior covering for said posts extending downwardly from the appropriate height for arm rests along said posts for a distance then diverging outwardly therefrom to form a heating and ventilating duct, arm rests connecting the top of said interior covering and said exterior covering, and insulating liners for said exterior covering between each of arm rests and the window thereabove, the thickness of said liners being substantially less than the thickness of said posts.

WILLIAM T. ROSSELL.